United States Patent
Moussavi (10) Patent No.: US 8,050,886 B2
(45) Date of Patent: Nov. 1, 2011

(54) MOTION PLANE CORRECTION FOR MEMS-BASED INPUT DEVICES

(75) Inventor: Farshid Moussavi, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/192,909

(22) Filed: Aug. 15, 2008

(65) Prior Publication Data
US 2010/0042358 A1 Feb. 18, 2010

(51) Int. Cl.
*G01P 15/00* (2006.01)
(52) U.S. Cl. ........................................................ 702/141
(58) Field of Classification Search ................ 702/141
See application file for complete search history.

(56) References Cited

U.S. PATENT DOCUMENTS

| | | | |
|---|---|---|---|
| 4,787,051 A | 11/1988 | Olson | |
| 5,181,181 A * | 1/1993 | Glynn | 702/141 |
| 5,587,558 A * | 12/1996 | Matsushima | 178/18.01 |
| 6,466,831 B1 | 10/2002 | Shibata et al. | |
| 2005/0110778 A1 * | 5/2005 | Ben Ayed | 345/179 |
| 2007/0146325 A1 * | 6/2007 | Poston et al. | 345/163 |
| 2008/0204407 A1 * | 8/2008 | Ueno | 345/156 |
| 2009/0025998 A1 * | 1/2009 | Brandmeier et al. | 180/282 |
| 2009/0153482 A1 * | 6/2009 | Weinberg et al. | 345/163 |

OTHER PUBLICATIONS

Goehl and Sachs, "Motion Sensors Gaining Inertia with Popular Consumer Electronics," InvenSense, Inc., White Paper, pp. 1-5.

* cited by examiner

*Primary Examiner* — Cindy Hien-Dieu Khuu
(74) *Attorney, Agent, or Firm* — Schwegman, Lundberg & Woessner, P.A.

(57) ABSTRACT

An electronic motion-based input device and method for correcting errors in acceleration due to a deviation from a horizontal plane of motion by correcting for gravitational acceleration components due to the deviation in the plane of motion.

12 Claims, 4 Drawing Sheets

MOTION PLANE CORRECTION FOR MEMS-BASED INPUT DEVICES

FIELD OF THE INVENTION

This invention relates to technology for monitoring motion of electronic input devices, and more particularly to technology for motion plane correction of motion-based input devices.

BACKGROUND OF THE INVENTION

Conventional input devices, such as computer mice, typically employ optical sensors, track wheels or track balls to control the motion of a cursor or other navigational object on a computer display screen. Other types of input devices that measure a force imparted onto the input device typically incorporate one or more accelerometers for sensing acceleration forces exerted on the input device as it is moved by a user. A velocity of the electronic input device may be calculated and estimated by integrating the measured acceleration over time, and a position estimate of the input device may be calculated by integrating its velocity over time. In this way, motion of an accelerometer-based input device may be translated to motion of a cursor or other navigational object on a computer display screen.

However, many existing methods for tracking two-dimensional motion with accelerometer-based devices do not adequately take into account variations in three-dimensional orientation. For example, an orientation change of only about 0.5 degrees from the horizontal plane can contribute up to 10 mG acceleration in a plane of motion, which can be significant with respect to human initiated motion. Therefore, there is a need for systems and methods that account for a tilt in a plane of motion so as to provide a result that is more indicative of a user's intended motion of the input device.

SUMMARY OF THE INVENTION

Embodiments of the present invention are directed to methods and apparatuses for reducing or eliminating tracking errors associated with moving an accelerometer based tracking device, or other force based tracking devices, at a tilt with respect to a plane normal to the direction of the gravitational force.

Embodiments of the present invention are directed to motion-based input devices and provide a method and system for correcting errors in acceleration measurements due to a deviation from a horizontal plane of motion by correcting for a gravitational acceleration components due to the deviation in the plane of motion. In one embodiment, the invention provides a system and method for determining an angle of tilt (tilt angle) of the plane of motion, and correcting for gravitational acceleration if the tilt angle is not excessively large.

In one embodiment, the invention provides a method for compensating for a tilted plane of motion for a motion-based input device. The method comprises, calculating a total acceleration of the electronic input device in a tilted plane of motion, calculating an angle of tilt of the tilted plane of motion, and estimating an error in the total acceleration of the electronic input device in the plane of motion due to the angle of tilt. The method further includes correcting the acceleration of the electronic input device based on the estimated error to obtain a corrected acceleration of the electronic input device.

In another embodiment, the invention provides an electronic input device that includes a motion sensing element operable to measure a motion of the electronic input device to obtain a motion input. The electronic input device further includes a processing element operable to: receive measured motion parameters, calculate a total acceleration of the electronic input device in a tilted plane of motion, calculate an angle of tilt of the tilted plane of motion, estimate an error in the total acceleration of the electronic input device in the tilted plane of motion due to the angle of tilt, and correct the acceleration of the electronic input device based on the error to obtain a corrected acceleration of the electronic input device. The electronic input device also includes an external interface operable to send the output to an external device (e.g., a computer).

In a further embodiment, the invention provides a computer-readable medium comprising program code for compensating for a tilted plane of motion for a motion-based input device. The computer-readable medium includes program code for obtaining motion parameter, calculating a total acceleration of the electronic input device in a tilted plane of motion, and an angle of tilt of the tilted plane of motion, and estimating an error in the total acceleration of the electronic input device in the tilted plane of motion due to the angle of tilt. The computer-readable medium also comprises program code for correcting the total acceleration of the electronic input device based on the error to obtain a corrected acceleration of the electronic input device.

BRIEF DESCRIPTION OF THE DRAWINGS

The following drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily drawn to scale.

DETAILED DESCRIPTION OF THE EXEMPLARY EMBODIMENT

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

Embodiments of the invention are directed toward methods and apparatuses for reducing or eliminating motion tracking errors associated with accelerometer-based input devices, or similar forced-based input devices. Although embodiments are described herein in the context of exemplary applications, such as compensating for tracking errors resulting from a gravitational force exerted on an input device that controls a cursor on a computer display screen, it is understood that the invention is not limited to such exemplary applications. The methods and apparatuses described herein may also be utilized in other applications with other types of input devices, such as various types of game controllers, for example. It is understood that the embodiments described herein are merely examples and the invention is not limited to these specific examples.

As used herein, the term "application" includes without limitation any unit of executable software that implements a specific functionality or theme. The unit of executable software may run in a predetermined environment; for example, a downloadable Java Xlet™ which runs within the JavaTV™ environment.

As used herein, the terms "receiving device" and "receiver" include without limitation video game consoles, set-top boxes, televisions, personal computers (whether desktop, laptop, or otherwise), digital video recorders, communications equipment, terminals, mobile devices such as iPhones™, and display devices.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, Matlab, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "processor," "microprocessor," and "digital processor" refer to all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die, or distributed across multiple components.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), Bluetooth, or IrDA families.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Figure 1:
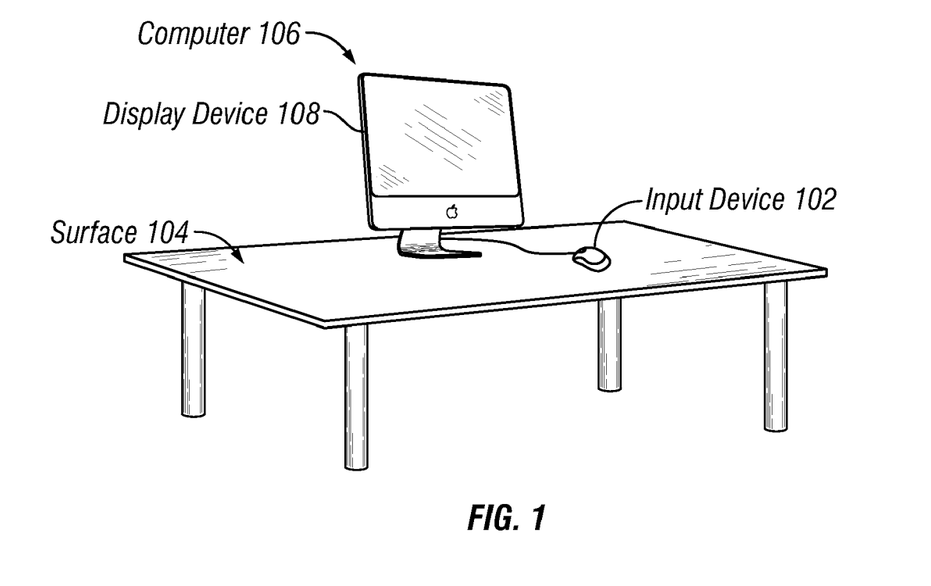
FIG. 1 illustrates a typical environment in which an input device may be used according to one embodiment of the present invention.

FIG. 1 is a block diagram illustrating a typical environment in which an input device can be used according to one embodiment of the present invention. An input device 102 is initially positioned upon a surface 104 such as a desk or a tabletop. In order to generate input data, a user manipulates the input device relative to the surface 104.

Note that in FIG. 1, the surface 104 is depicted as being flat or substantially flat; however, neither condition is necessary according to embodiments of the present invention. Also note that in some embodiments, the surface 104 need not necessarily be situated beneath the input device 102. For example, the surface 104 may be tilted, situated above the input device 102, inverted, or vertically oriented. Also note that in certain embodiments, multiple surfaces 104 can be utilized.

A receiving device (such as the depicted computer 106) is adapted to receive input data generated from the input device 102. In one embodiment, the receiving device 106 comprises at least one interface adapted to receive the generated data. The input device 102 can connect to the receiving device over a wireless or a wired communication link (such as a serial bus cable or other physical connector).

The receiving device 106 is adapted to display a navigational object (for example, a pointer, cursor, selector box, or other such indicator) upon its display screen 108. During operation, when the user manipulates the input device 102 relative to the surface 104, input signals are transmitted to the receiving device 106 and the navigational object responds according to the user's input. It is understood that the receiving device 106 can be any type of computing device having a display such as an iMac™ computer or a personal computer having a separate display monitor, for example. Other types of computing devices having a display or connected to a display (e.g., by a wired or wireless communication link) for displaying navigational objects would be readily apparent to those of ordinary skill in the art.

Figure 2:
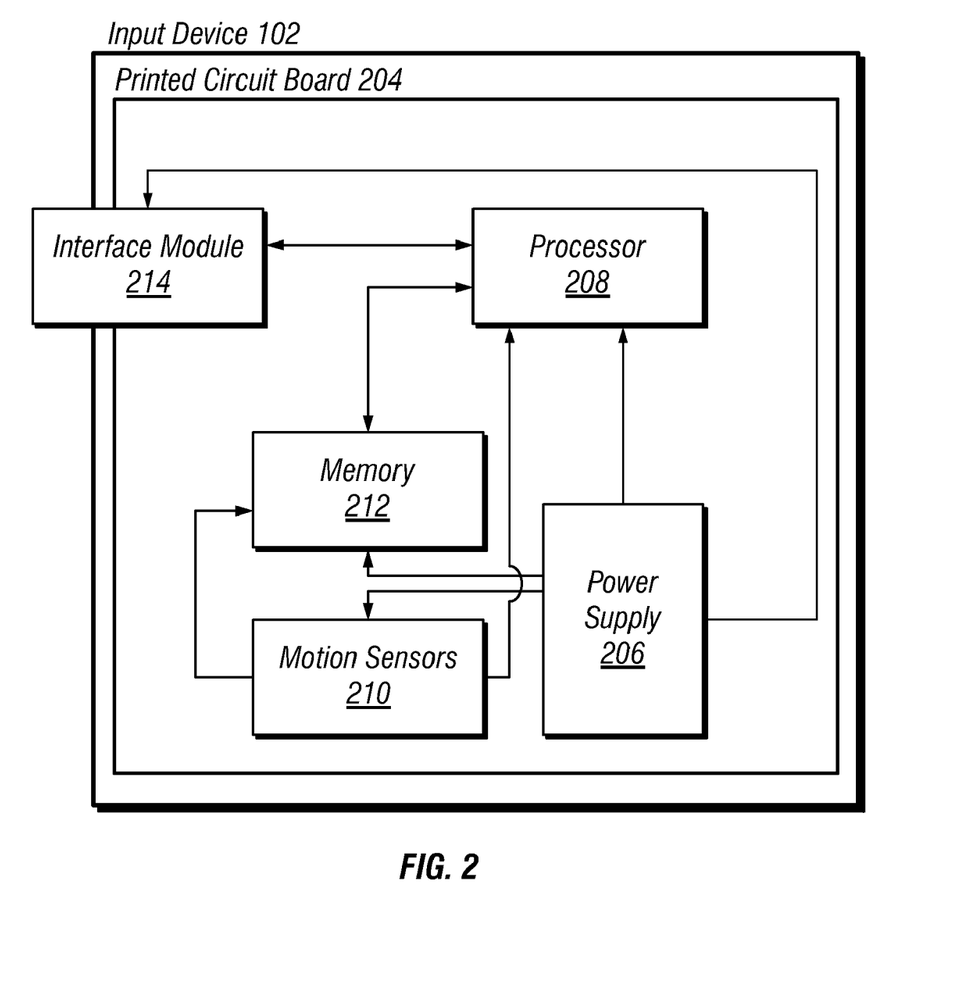
FIG. 2 is a block diagram of a modular arrangement of an input device according to one embodiment of the present invention.

FIG. 2 is a block diagram of a modular arrangement of the input device 102 according to one embodiment of the present invention. The input device 102 houses a printed circuit board 204 comprising electrical leads which enable various modules to communicate with other connected modules.

A power supply 206 provides a source of power to modules electrically coupled to the printed circuit board 204. In some embodiments, power is supplied externally from one or more conductive wires, for example, as by a power cable or serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations, such as registers, memory buffers, main memory, mass storage, and/or removable media. In some embodiments, the memory 212 is adapted to store velocity thresholds and/or applicable ranges for each measured parameter, and code or algorithms for performing the operations described herein. In alternative embodiments, this data may be stored in a remote memory source (e.g., a hard drive of the receiving device 106), and the input device 102 merely transmits raw data to the receiving device 106 for processing using one or more processors (not shown) contained within the housing of the receiving device 106.

One or more processors 208 are adapted to execute sequences of instructions by loading and storing data to the memory 212. These instructions may include, for example, instructions for data conversions, formatting operations, communication instructions, and/or storage and retrieval operations. Additionally, the processors 208 may comprise any type of digital processing devices including, for example, digital signal processors, reduced instruction set computers, general-purpose processors, microprocessors, gate arrays, programmable logic devices, reconfigurable compute fabrics, array processors, and application-specific integrated circuits. Note also that the processors 208 may be contained on a single unitary IC die or distributed across multiple components.

An interface module 214 enables data to be transmitted and/or received via one or more communication protocols or networks. In one embodiment, data transmitted to a receiving device is first packetized and processed according to a standardized protocol. In many variants, the standardized protocol may include a plurality of network layers such that each layer provides services to the layer above it and receives services from the layer below it. The interface module 216 may accommodate any wired or wireless protocol including, without limitation, USB, FireWire, Ethernet, Gigabit Ethernet, MoCA, radio frequency tuners, modems, WiFi, Bluetooth, WiMax, and/or Infrared Data Association.

One or more motion sensors 210 enable the input device 102 to determine velocity values during a given instant, or alternatively, over a given period of time. Various types of motion sensors such as accelerometers, gyroscopes, etc. may be incorporated as motion sensor 210. In one embodiment, the motion sensors 210 comprise one or more accelerometers adapted to detect the current acceleration of the input device 102. In this embodiment, velocity values are determined by logic adapted to integrate a detected acceleration quantity. In one embodiment, the motion sensor 210 includes at least one micro electro-mechanical system (MEMS) accelerometer. Optionally, the micro electro-mechanical system may comprise a dedicated microprocessor adapted to interact with one or more accelerometers that sense acceleration forces exerted on the input device 102.

Acceleration can refer to the rate of change of the velocity of an object, while velocity can refer to the rate of change in position of an object. Note that within this context, acceleration, velocity, and position are mathematically related in the following manner:

$$\vec{a} = \frac{d\vec{v}}{dt} \text{ and } \vec{v} = \frac{d\vec{s}}{dt} \therefore \vec{a} = \frac{d(d\vec{s})}{dt^2} \quad (1)$$

$$\vec{v} = \int (\vec{a})dt \text{ and } \vec{s} = \int (\vec{v})dt \therefore \vec{s} = \int \left( \int (\vec{a})dt \right) dt \quad (2)$$

As expression (1) indicates, acceleration can be determined by differentiating velocity, and velocity can be determined by differentiating position. Thus, the double-derivative of an object's position can yield the object's acceleration.

The reverse relationships are also satisfied as shown in expression (2). Velocity can be determined by integrating acceleration, and position can be determined by integrating velocity. Therefore, a double-integration of the object's acceleration can yield the object's position.

In addition, the direction of a dynamic force can be mathematically related to the magnitude and polarity of forces applied to the input device. This relationship can be expressed as:

$$|F| = \sqrt{(Fx^2 + Fy^2)} \quad (3)$$

The corresponding unit vectors can then be derived using the following expression:

$$X \text{ direction} = Fx/|F|, Y \text{ direction} = Fy/|F| \quad (4)$$

In this manner, a computer-based device having appropriate logic (which may be implemented as any combination of software, firmware and/or hardware according the scope of the present invention) can determine both velocity and position of the input device 102 by an input acceleration quantity and can determine directional unit vectors of the input device 102 by input force magnitude and polarity values. Note that in some embodiments, the movement information can be written to and retrieved from the memory 212. In still other embodiments, this data can be stored in external memory (e.g. a hard drive of the computer 106) and the input device 102 can transmit raw data to the computer 106 for processing.

Figure 3:
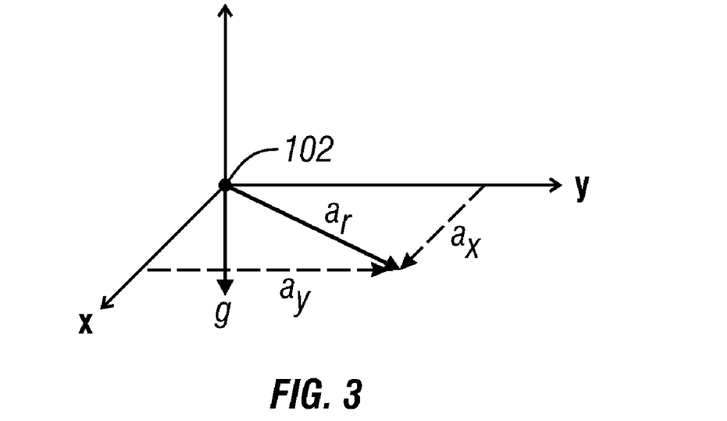
FIG. 3 is an initial model illustrating components of acceleration of an input device in a horizontal plane according to embodiments of the present invention.

FIG. 3 is a model illustrating components of acceleration of input device 102 moving in a plane normal to gravitational force g in accordance with embodiments of the present invention. A plane normal to the gravitational force can also be referred to herein as a horizontal plane or an x-y plane. As illustrated, gravitational force g is exerted on input device 102. In addition, as a user moves the input device 102, the input device undergoes a net acceleration $a_r$. As explained above, input device 102 can have motion sensors capable of measuring acceleration values in each of the three dimensions at a given point in time. The acceleration value measured in the x dimension can correspond to acceleration component $a_x$, the acceleration value measured in the y dimension can correspond to the acceleration component $a_y$, and the acceleration value measured in the z dimension can correspond acceleration component $a_z$. Note that acceleration component $a_z$ should be equal to acceleration due to gravitational force g when the input device is moved in the horizontal plane. Moreover, as the gravitational force g is normal to the net acceleration $a_r$ of the input device 102, the gravitational force g should not affect, or at least not affect in a significant way, the measurements of the input device 102 in the x and y dimensions, as the gravitational force g would add a zero component to those acceleration measurements. Accordingly, the acceleration measurements in the x and y dimensions can provide an accurate indication of the actual motion of the input device 102. In contrast, if the gravitational force contributes to the acceleration measurements in the x and y dimensions, then using those measurements can provide an inaccurate indication of the motion of the input device 102.

Figure 4:
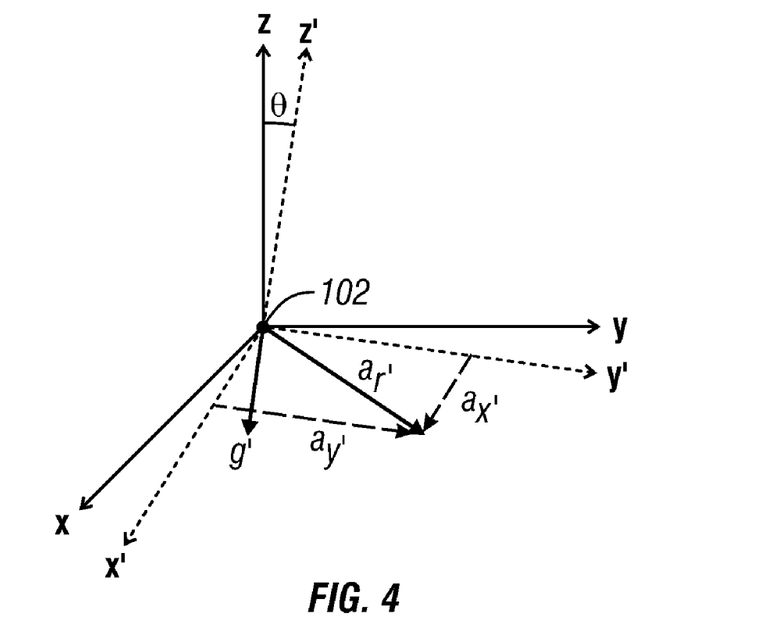
FIG. 4 is an initial model illustrating components of acceleration of an input device relative to in tilted plane of motion according to embodiments of the present invention.

FIG. 4 is a model illustrating components of acceleration relative to a tilted plane of motion. In the coordinate system depicted in FIG. 4, the horizontal plane can extend along the x and y axes and gravitational force g (not shown in FIG. 4) can be normal to the horizontal plane and parallel to the z-axis. A plane of motion (also referred to herein as the x'-y' plane) can be defined as a plane in which the input device 102 is moving. In the coordinate system depicted in FIG. 4, the plane of motion can extend in the x' and y' axes and can be perpendicular to the z'-axis. The plane of motion can be tilted with respect to the horizontal plane at a tilt angle φ. Examples of when the plane of motion may be titled can include when a supporting surface upon which an input device 102 moves is uneven or tilted. Another example can include when the input device is held at a tilted angle relative to the horizontal plane.

When the plane of motion is tilted with respect to the horizontal plane, then the acceleration measurements provided by the input device 102 can correspond to the acceleration in the plane of motion—not the acceleration of the input device 102 relative to a horizontal plane. Accordingly, the measured acceleration values can be indicative of the acceleration of the input device 102 in the x', y' and z' dimensions. In addition, the acceleration value detected in the z-dimension may not correspond to the gravitational force g, but rather a tilted gravitational force g', where the following expression can be used to relate the tilted gravitational force g' to the gravitational force g:

$$g' = g \cos \phi \qquad (5)$$

Thus, when the tilt angle $\phi$ is zero, then g'=g, as is to be expected.

When gravitational force g is not normal to the plane of motion (i.e., when the tilt angle $\phi$ is nonzero), then the gravitational force g would add nonzero components to the acceleration measurements in the plane of motion. As a consequence, the acceleration measurements would not be indicative of the actual motion of the input device 102, as the measured values from the accelerometer-based sensors would have these additional nonzero components associated with gravity added to the actual acceleration of the input device 102. Therefore, to obtain more accurate information indicative of the motion of the input device 102, the nonzero components associated with gravity can be taken into account (e.g., added or subtracted from the acceleration measurements in the plane of motion depending upon the angle of tilt).

Figure 5:
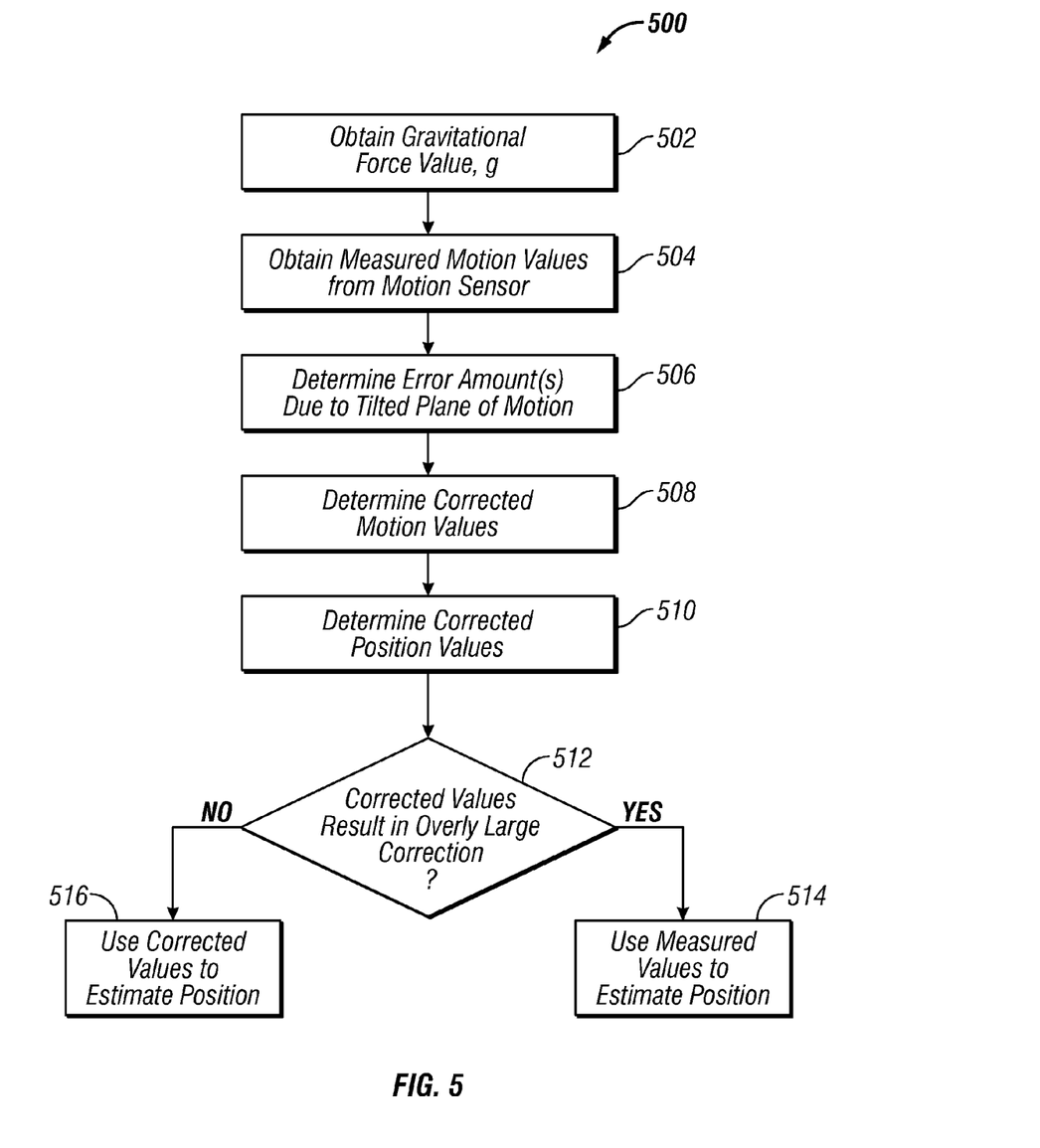
FIG. 5 is an exemplary flow diagram of a process for correcting movement information detected by an input device moving in a tilted plane of motion in accordance with various embodiments of the present invention.

FIG. 5 shows an exemplary flow diagram illustrating a tilt angle correction process 500 in accordance with an embodiment of the invention. The various tasks performed in connection with process 500 may be performed by hardware, software, firmware or any combination thereof. Instructions for performing process 500 may be modified in a computer-readable medium having computer executable instructions for controlling and operating the process 500. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

In general, process 500 corrects for errors associated with acceleration values measured relative to a tilted plane of motion. Process 500 calculates or otherwise determines amount(s) of error associated with the acceleration values measured relative to the plane of motion and accounts for the error(s), thereby providing corrected measurements that more accurately reflect the actual movement of the input device 102 across or within the plane of motion.

The tilt angle correction process 500 begins by measuring a value for the gravitational force g in a step 502. In one exemplary embodiment, the value of the gravitational force g is generated during an initial calibration process of the input device 102. The initial calibration process can include placing the input device 102 on a surface that is parallel to the horizontal plane and generating an accelerometer reading from motion sensor 210 in the z dimension. Alternatively, in one embodiment, if the device is not resting on a horizontal plane, the calibration process can include measuring the magnitude of the vector sum of all three axes in a three-dimensional Cartesian coordinate system. In other words, regardless of the orientation of the input device, during a rest condition, the total acceleration measured on all three axes should be constant, within a predetermined small threshold to allow for measurement noise, for example. This calibration reading can be stored in memory 212 as an acceleration value for the gravitational force g.

Next, in a step 504, the input device 102 obtains acceleration measurements from motion sensor 212 as a user moves the input device 102. These measurements can correspond to acceleration components $a_x'$ and $a_y'$ in the plane of motion, as well as acceleration component $a_z'$ in the dimension normal to the plane of motion. Note $a_z'$ can correspond to tilted gravitational component g'. The measurements generated in step 504 can be transmitted to a receiving computer or a local processor for processing. The measurements generated in step 504 can also be stored in memory 212.

In step 506, process 500 determines amount(s) of error in the accelerometer measurements obtained in step 504 due to a tilted plane of motion. As can be appreciated by one skilled in the art after reviewing this disclosure, determining the amount(s) of error in the measurements obtained during step 504 can be calculated or otherwise determined in various ways, and the below methodology for determining the amount(s) of error is merely one illustrative example.

Further to step 506, a tilt angle $\phi$ can be calculated based on the following relationship:

$$\phi = \cos^{-1}\left(\frac{g'}{g}\right) \qquad (6)$$

Note, the relationship (6) is based on the relationship (5) described above. As discussed above, the tilt angle corresponds to the angle that the plane of motion is tilted with respect to an ideally horizontal plane.

A value for the net acceleration of the input device 102 along the plane of motion $a_r'$ can then be calculated using the values of $a_x'$ and $a_y'$ measured in step 504. The following expression can be used to calculate a value of $a_r'$:

$$a_r' = \sqrt{a_x'^2 + a_y'^2} \qquad (7)$$

Having thus obtained values for $\phi$, $a_r'$, $a_x'$, $a_y'$, g, and g', values for components of gravity in the tilted plane of motion can be calculated using the following expressions:

$$g_x' = g * \sin(\phi) * \frac{a_x'}{a_r'} \qquad (8)$$

$$g_y' = g * \sin(\phi) * \frac{a_y'}{a_r'} \qquad (9)$$

The values for $g_x'$ and $g_y'$ can correspond to the input device's components of gravity in the x' and y' dimensions, respectively, due to the gravitational force g. The values for $g_x'$ and $g_y'$ can therefore be considered the amounts of error in the measured acceleration values due to the tilted plane of motion.

Corrected motion values can be determined in step 508. As discussed above, the corrected motion values can more closely relate to the actual motion of the input device 102. To obtain corrected motion values, the error values determined in step 506 can be subtracted from the values obtained in step 502, using the following expressions:

$$a_{xc}' = a_x' - g_x' \qquad (10)$$

$$a_{yc}' = a_y' - g_y' \quad (11)$$

where the values for $a_{xc}'$ and $a_{yc}'$ are the corrected acceleration values in the plane of motion. Note that the values for $g_x'$ and $g_y'$ can be positive if the angle of tilt is in a downward direction (as shown in FIG. 4); whereas the values can be negative if the angle of tilt is in an upward direction. Therefore, the corrected values will be less than the measured values (i.e., $a_{xc}' < a_x'$ and $a_{yc}' < a_y'$) when the angle of tilt is in a downward direction and the corrected values will be larger than the measured values (i.e., $a_{xc}' > a_x'$ and $a_{yc}' > a_y'$) when the angle of tilt is in an upward direction.

In step 510, values corresponding to a change in position of the input device 102 due to the user's motion can then be calculated. Change in position can be calculated by double-integrating the corrected acceleration values:

$$s_x' = \iint a_{xc}' dt \quad (11)$$

$$s_y' = \iint a_{yc}' dt \quad (12)$$

Thus, these positional values for $s_x'$ and $s_y'$ can more closely relate to a user's intended motion of the input device 102 on a tiled plane of motion. It is understood, however, that other known methods may be employed to infer position from acceleration and/or velocity, taking into account measurement noise, for example.

Next, in decision step 512, process 500 can decide if the corrected measurements would result in overly large corrections. Overly large corrections can cause instability in tracking, for example. Various calculations and comparisons can be used to determine whether the corrected measurements would result in overly large corrections. Two examples are provided below, although other ways for determining if an overly large correction would be apparent to one of skill in the art after reviewing this disclosure, and, thus, fall within the scope of the present invention.

As a first example, process 500 can calculate a value for a net tilted gravitational error $g_r'$ in the tilted plane of motion and compare the value for $g_r'$ with the value of the gravitational force g obtained in step 502. The value for $g_r'$ can be calculated using the following expression:

$$g_r' = \sqrt{g_x'^2 + g_y'^2} \quad (13)$$

If the value for $g_r'$ is about the same as the value of measured gravitational force g, then process 500 can decide that the error correction would result in an overly large correction and not use the corrected values for tracking the movement of the input device 102.

As a second example, process 500 can compare the calculated value for the tilt angle $\phi$ to a predetermined threshold value, e.g., 25 degrees. If the value of the tilt angle $\phi$ exceeds the threshold value, then process 500 need not use the corrected values for tracking the movement of the input device 102.

If process determines that the corrected motion values would result in an overly large correction, then process 500 can proceed to step 514, where the measured values are used to indicate the position of the input device 102, rather than the corrected values. However, if process 500 determines that the corrected motion values would not result in overly large corrections, then the process 500 can proceed to step 516, where the corrected values are used to indicate the positional change of the input device 102.

Although the present invention has been fully described in connection with exemplary embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An electronic input device, comprising:
   one or more motion sensors operable to generate one or more signals indicative of a measured acceleration of the input device moving in a plane of motion that is tilted relative to a horizontal plane;
   a processing element coupled to the one or more motion sensors and operable to:
   receive the one or more signals;
   based at least in part on the one or more signals, calculate one or more corrected motion values that are indicative of an actual motion of the input device and that compensate for one or more effects of movement in the plane of motion that is tilted relative to the horizontal plane; and
   determine if an angle of tilt of the plane of motion with respect to the horizontal plane is not outside of a range; and
   an external interface operable to send one or more signals indicative of the corrected motion values to a receiving device if the angle of tilt of the plane of motion with respect to the horizontal plane is not outside of a range.

2. The device of claim 1, wherein at least one motion sensor comprises a MEMS-based accelerometer.

3. The device of claim 1, wherein the processing element is further operable to calculate one or more error values corresponding to an effect of gravity on the input device, wherein the processor additionally bases the calculation of the one or more corrected motion values on the one or more error values.

4. The device of claim 1, wherein the processing element is further operable to calculate the angle of tilt of the plane of motion with respect to a horizontal plane.

5. The device of claim 1, wherein the processing element is further operable to calculate an x' gravity error component and y' gravity error component and wherein the one or more corrected motion values are additionally based on the x' gravity error component and the y' gravity error component.

6. The device of claim 1, wherein the device comprises a plurality of motion sensors, and wherein each motion sensor comprises an accelerometer.

7. An electronic input device, comprising:
   a plurality of accelerometers configured to each generate a respective signal of acceleration along a respective axis of a plane of motion of the input device;
   a sensor configured to generate a sensor signal of acceleration along an axis at an angle to the plane of motion of the input device; and
   a processor configured to:
      receive the accelerometer signals and the sensor signal;
      determine a corrected motion value indicative of an actual motion of the device;
      determine if an angle of tilt of the plane of motion with respect to the horizontal plane is not outside of a range; and
      determine if the corrected motion value is to be used, the corrected motion value reflecting whether the plane of motion is tilted relative to a horizontal plane,
      wherein the processor determines that the corrected motion value is to be used if the angle of tilt of the plane of motion with respect to the horizontal plane is not outside of a range.

8. The device of claim 7, wherein the processor is configured to determine a corrected motion value by executing a plurality of instructions stored in a machine readable storage medium, to perform operations comprising,
   determining a gravitational force value, and
   determining the corrected motion value in reference to the gravitational force value.

9. The device of claim 7, wherein the processor is configured to determine a corrected motion value by executing a plurality of instructions stored in a machine readable storage medium, to perform operations comprising,
   identifying an initial set of motion values based on the received accelerometer signals;
   determining a gravitational force value,
   using the determined gravitational force value to determine the presence of an error amount in at least one initial motion value, and
   determining a position value through use of the determined error amount.

10. The device of claim 7, wherein the processor is further configured to determine a position value through use of the corrected motion value.

11. The device of claim 7, wherein the sensor comprises an accelerometer sensitive to an axis that is perpendicular to the axis of sensitivity of at least two other accelerometers.

12. An electronic input device, comprising:
   one or more motion sensors operable to generate one or more signals indicative of a measured acceleration of the input device in a three dimensional space, wherein two dimensions of said three dimensional space form a plane of motion of the input device, the plane of motion being tilted relative to a plane that is normal to the effect of gravity;
   a processing element coupled to the one or more motion sensors and operable to:
      receive the one or more signals;
      based at least in part on the one or more signals, calculate one or more corrected motion values that are indicative of an actual motion of the input device and that compensate for one or more effects of movement in the plane of motion that is tilted relative to the plane that is normal to the effect of gravity; and
      determine if an angle of tilt of the plane of motion with respect to the plane that is normal to the effect of gravity is not outside of a range; and
   an external interface operable to send one or more signals indicative of the corrected motion values to a receiving device if the angle of tilt of the plane of motion with respect to the plane that is normal to the effect of gravity is not outside of a range.

* * * * *